United States Patent [19]

McCartney et al.

[11] Patent Number: 5,088,806
[45] Date of Patent: Feb. 18, 1992

[54] APPARATUS AND METHOD FOR TEMPERATURE COMPENSATION OF LIQUID CRYSTAL MATRIX DISPLAYS

[75] Inventors: Richard I. McCartney, Scottsdale; John A. Rupp, Glendale, both of Ariz.

[73] Assignee: Honeywell, Inc., Minneapolis, Minn.

[21] Appl. No.: 465,796

[22] Filed: Jan. 16, 1990

[51] Int. Cl.$^5$ .............................................. G02F 1/13
[52] U.S. Cl. ..................... 359/84; 340/784; 359/86
[58] Field of Search ............ 350/331 T, 350 S, 331 R, 350/332; 340/793, 784

[56] References Cited

U.S. PATENT DOCUMENTS

| | | | |
|---|---|---|---|
| 4,509,043 | 4/1985 | Mossaides | 340/721 |
| 4,634,225 | 1/1987 | Haim et al. | 350/331 T |
| 4,890,097 | 12/1989 | Yamashita et al. | 340/719 |
| 4,923,285 | 5/1990 | Ogino et al. | 350/331 T |
| 4,952,032 | 8/1990 | Inoue et al. | 350/350 S |

FOREIGN PATENT DOCUMENTS

| | | | |
|---|---|---|---|
| 59-224827 | 12/1984 | Japan | 350/331 T |
| 63-184487 | 7/1988 | Japan . | |

Primary Examiner—John Zazworsky
Assistant Examiner—Ron Trice
Attorney, Agent, or Firm—Dale E. Jepsen; D. J. Lenkszus; A. Medved

[57] ABSTRACT

In a liquid crystal display, the optical transmission of the liquid crystal medium as a function of applied electric field varies with temperature. In order to ensure that the temperature of the liquid crystal medium can provide a practical response time, a heating element, along with a sensor element and a thermostat, establishes the temperature of the liquid crystal display in an appropriate range. The output signal of the sensor element is digitized and is used as a first portion of a memory unit address. A second portion of the memory unit address is provided by digitized command signals either from an operator or from the processing apparatus controlling the image of liquid crystal display. The logic signals stored at the location determined by the first and second address portions identify an electric field (applied voltage) that provides compensation for temperature and compensation for non-linear characteristics of the liquid crystal medium. The logic signals from the memory unit are converted into a voltage to be applied to the liquid crystal display.

17 Claims, 3 Drawing Sheets

APPARATUS AND METHOD FOR TEMPERATURE COMPENSATION OF LIQUID CRYSTAL MATRIX DISPLAYS

BACKGROUND OF THE INVENTION

1. Field of the Invention

This invention relates generally to display technology and, more particularly, to liquid crystal displays. The invention addresses the problem of the temperature variation of the liquid crystal display characteristics when the environmental temperature can not be optimized.

2. Description of the Related Art

The transmission of light through a flat panel liquid crystal display is determined by the alignment of the liquid crystal molecules. The alignment of the liquid crystal molecules is, in turn, determined by the electric field to which the molecules are subjected. Referring to FIG. 1A, FIG. 1B, and FIG. 1C, a pictorial representation of the effect of an electric field on liquid crystal molecules of a twisted nematic liquid crystal material in a typical display environment is illustrated. Substrates 29 and 32 enclose the liquid crystal material. Polarizing elements 31, having a predetermined relative orientation, are coupled to substrates 29 and 32. Also deposited on the substrates 29 and 32 are (transparent) electrodes 30 and 34 respectively. The liquid crystal molecules 40 are enclosed between the substrates. In FIG. 1A, when a voltage, that subjects the liquid crystal molecules to an electric field with a magnitude less than a threshold value, is applied to electrodes 30 and 34, then the molecules of the liquid crystal material are not affected and light is not transmitted through the cell, i.e., through polarizing elements 31. In FIG. 1B, a voltage is applied to electrodes 30 and 34 of sufficient strength to cause complete element (of the relative orientation) of substantially all of the liquid crystal molecules 40. With this complete alignment (or saturation) of the molecules 40, light is transmitted through polarizing elements 31. In FIG. 1C, the voltage applied between electrodes 30 and 34 provides for partial alignment of the liquid crystal molecules 40 and a portion of the light applied to the cell is transmitted through polarizing elements 31.

In the prior art, a (flat panel) liquid crystal display can have a plurality of electrically separated display regions, each display region also being known as a display cell or, when the regions designate a small portion of the display, each display region is known as a pixel. Referring to FIG. 2, the apparatus for activation of the areas of a flat panel display is shown. The electrodes of each display region form a capacitor 5. A thin film transistor 20, acting as a switching element in response to control and voltage signals applied thereto, controls the charge that is stored on the plates of the capacitor and, therefore, controls the voltage and resulting electric field imposed on the liquid crystal material of the cell. When the gate terminal of transistor 20 is enabled by means of a control voltage applied to the row n conductor, the capacitor 5 is charged to the voltage applied to column m conductor. In this manner, a controllable charge is applied to each individual capacitor of the display, and hence the transmission through each individual capacitor of the display can be individually controlled.

Referring next to FIG. 3, the technique for providing a liquid crystal display for color images is shown. The substrates 29 and 32 have polarizing elements 31 with a predetermined relative orientation applied thereto and enclose the liquid crystal material 40. The substrate 32 has red, green, and blue filters 33 coupled thereto. Covering the color filters 33 is a transparent common conductor 34. Associated with each color filter region 33 is an electrode 30. The voltage applied between electrode 30 and the common electrode 34 determines the transmission of light through the liquid crystal in the region of the associated filter 33. Therefore, the intensity of the light transmitted through each color filter 33 can be controlled and the cumulative effect can be used to provide a color image.

The alignment of the liquid crystal molecules, in addition to the dependence on the applied electric field, is a function of the temperature, the temperature in turn affecting such properties as the elastic constants which in turn affect the electric field required for the alignment of the liquid crystal molecules. Referring to FIG. 4, a plot of transmission of light versus voltage (i.e., electric field) for a liquid crystal enclosed between generally parallel plates at several temperatures is illustrated.

The temperature dependence of the transmission of light through the liquid crystal flat panel cell is particularly critical in the region cf the on-set of transmission of light. In this region, relatively modest changes in temperature can result in a relatively large change in the transmission of light. However, it will be clear from review of FIG. 4 that the voltage for a selected transmission of light in one temperature range will provide a different transmission of light at a different temperature. While the effect of the change in transmission can be negligible in an on-off type of liquid crystal display when the operation is confined to the two extreme (and flat) portions of the transmission versus voltage characteristics of the liquid crystal material, in a display in which a grayscale is employed, the change in transmission can increase the difficulty of understanding the material presented by the display. In the case of color displays, the loss of accurate color tracking can compromise the benefits of providing a display with color.

A further problem can be identified with reference to FIG. 4. The grayscale characteristics of the liquid crystal display are not linear except for a limited region in the mid-transmission range. The operator will typically wish to provide an input signal from settings for a switch or similar apparatus which provide a linear scale. The conversion from a linear input signal to a signal providing a linear transmission of the liquid crystal display is typically referred to as the gamma correction to the input signal.

A need has therefore been felt for apparatus and method for providing temperature compensation for the optical transmission characteristics of a liquid crystal display. In addition, a need has been felt for apparatus and method in which the gamma correction can be combined with the temperature correction apparatus.

FEATURES OF THE INVENTION

It is an object of the present invention to provide an improved display apparatus.

It is a feature of the present invention to provide an improved flat panel liquid crystal display.

It is another feature of the present invention to provide temperature compensation for the activation of a liquid crystal display.

It is a still further feature of the present invention to provide both temperature compensation and correction for the non-linear optical transmission versus voltage characteristic for a liquid crystal display.

SUMMARY OF THE INVENTION

The aforementioned and other features are attained, according to the present invention, by providing a liquid crystal display with a heater element, a temperature sensing element, and a thermostat. These elements ensure that the liquid crystal material has a sufficient response time for the display application. The output signal of the temperature sensing element is digitized and used as a first portion of a memory unit address. A second portion of the memory unit address is determined by a command signal either from an operator or from image processing apparatus identifying a desired transmission. The logic signals stored at the memory unit address determined by the first and second address portions provide a digital signal representation of a voltage which, when applied to the liquid crystal display provides temperature compensation and compensation for the nonlinear voltage excitation characteristics of the liquid crystal display.

These and other features of the invention will be understood upon reading of the following description along with the drawings.

DESCRIPTION OF THE PREFERRED EMBODIMENT

1. Detailed Description of the Figures

Figure 5:
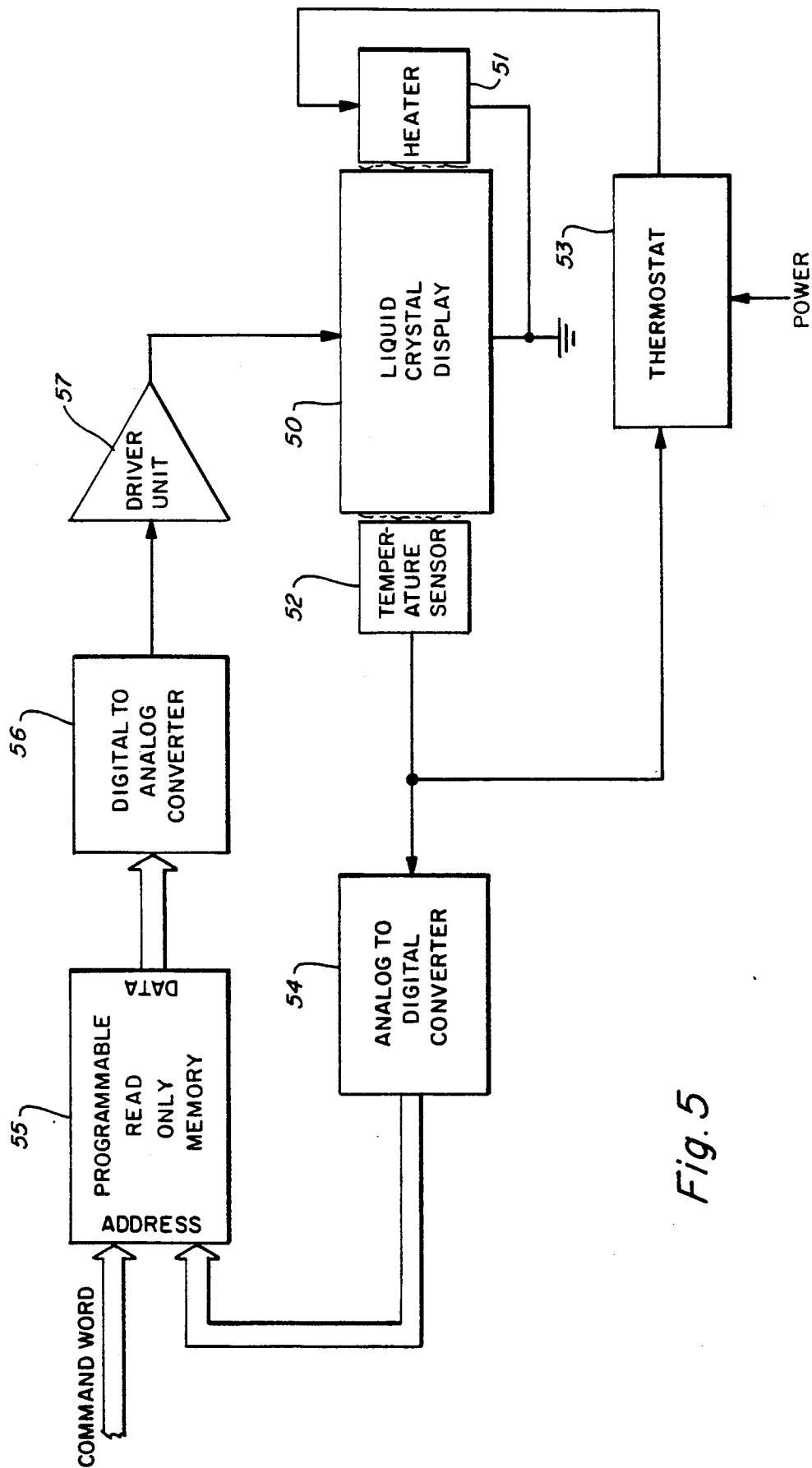
FIG. 5 is a block diagram illustrating the apparatus used in the temperature compensation of a liquid crystal display according to the present invention.

Referring now to FIG. 5, a block diagram of the present invention is shown. The liquid crystal display unit 50 has heater 51 and temperature sensor 52 in thermal contact therewith. The thermal sensor 52 applies a signal to thermostat 53. The signal from temperature sensor 52 causes the thermostat 53 to maintain the heater 51 and, consequently, maintain the thermally coupled liquid crystal display unit 50 at a preselected temperature. An output signal from the temperature sensor 52 is also applied to an analog to digital converter unit 54. The output signal from the analog to digital converter unit 54 is applied to a portion of the address terminals of P(rogrammable) R(ead) O(nly) M(emory) unit 55. A command word is also applied to the address terminals of PROM unit 55. The output signals from the PROM unit 55 are applied to a digital to analog converter unit 56. The output signals from the digital to analog converter 56 is applied to driver unit 57. The output signals from the driver unit 57 are applied to the appropriate portion of the liquid crystal display unit 50 by addressing apparatus normally included in the liquid crystal display.

2. Operation of the Preferred Embodiment

For many applications, such as in avionics, it is necessary that the temperature of the liquid crystal material of the display be high enough for sufficient display response time. The heater element, the temperature sensor element, and the thermostat of the present invention ensure that the temperature of the liquid crystal is in a range that provides an acceptable response time, i.e., when the display unit is operated over a wide temperature range such as −15° C. to 70° C. Once the general range of the temperature has been established, then the signal from the temperature sensing element, in combination with the command signal, the command signal, identifying the required optical transmission for the display, is used to address a storage location in a memory unit, the storage location containing a digital signal that identifies the voltage needed, at the temperature determined by the temperature sensing element to obtain the correct optical transmission. The logic signal group is then applied to a digital to analog converter which provides the voltage to be applied to the display region. As will be clear, the signal group stored in the memory location can also compensate for the nonlinearities of the voltage versus optical transmission, i.e., at the measured temperature.

Figure 1:
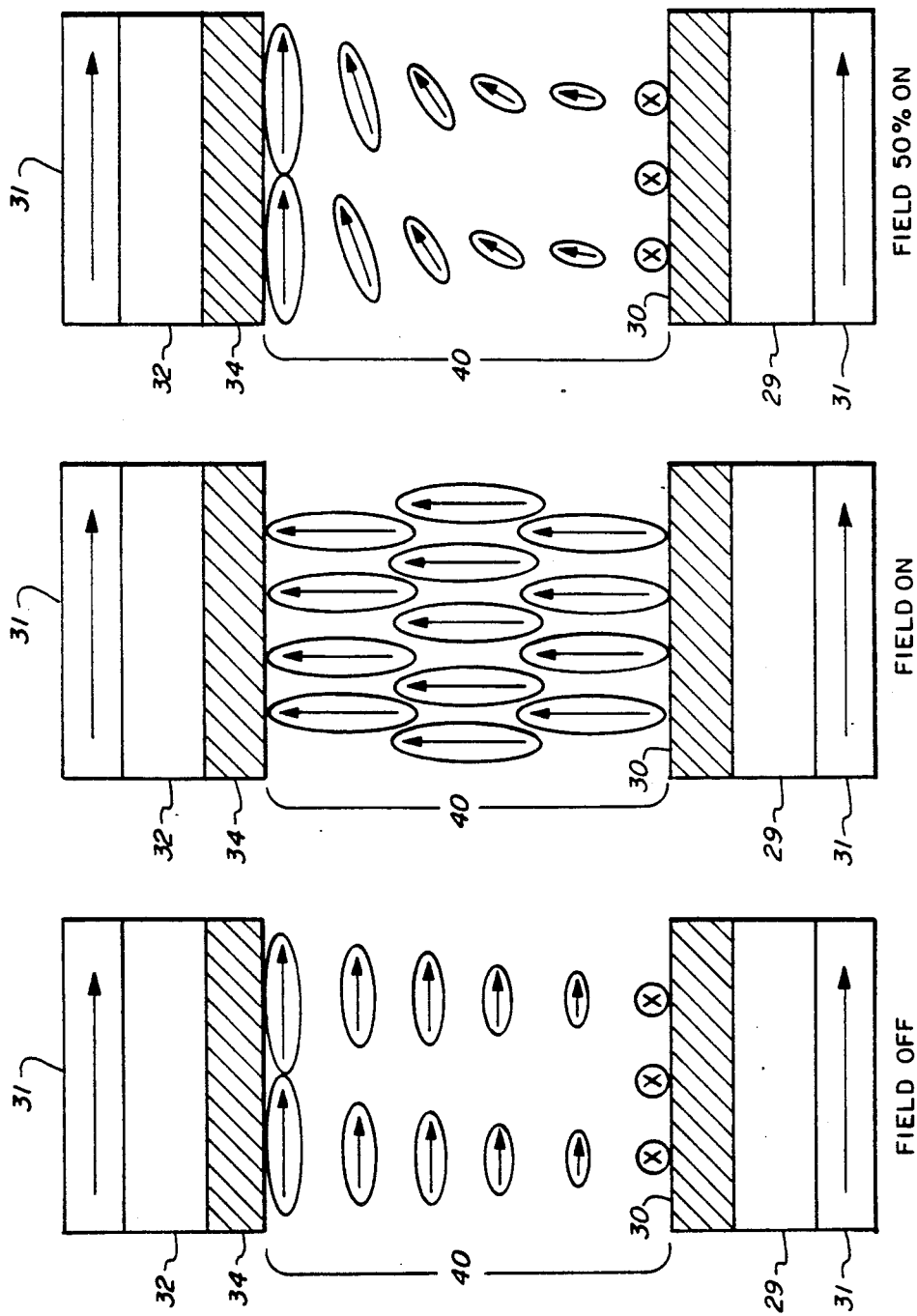
FIG. 1A is a pictorial representation of liquid crystal molecules in the absence of an electric field.
FIG. 1B is a pictorial representation of liquid crystal molecules in the presence of an electric field with sufficient strength to completely align the molecules.
FIG. 1C is a pictorial representation of liquid crystal molecules in the presence of an electric field providing partial orientation of the liquid crystal molecules.
Figure 2:
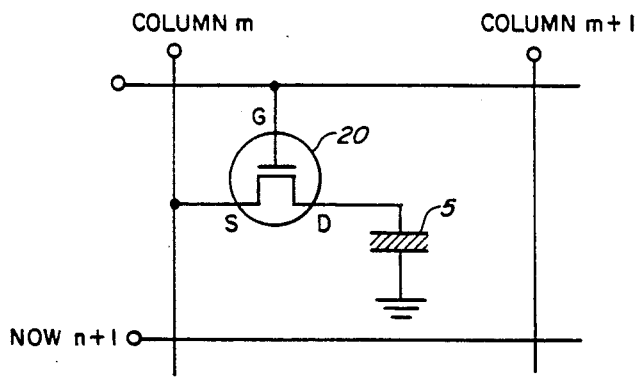
FIG. 2 is a circuit diagram of the apparatus used in charging the capacitor individual liquid crystal display regions.
Figure 3:
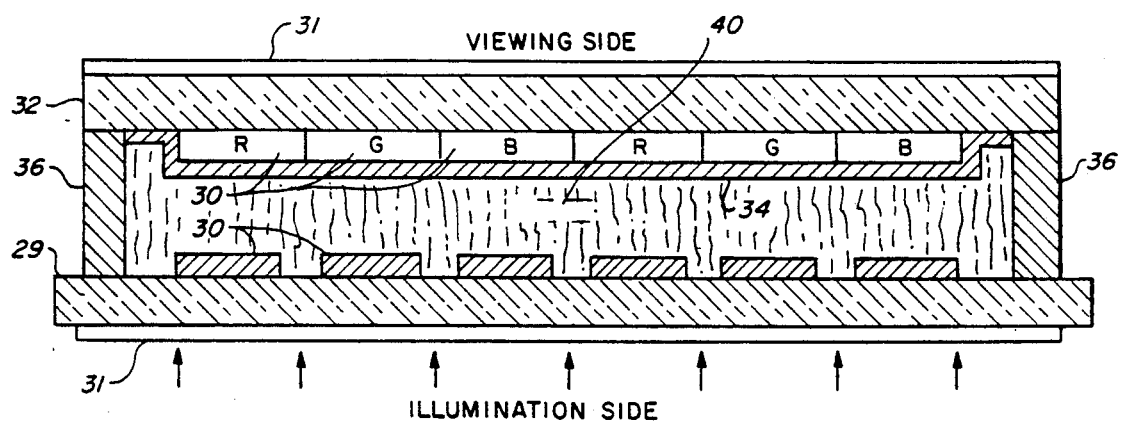
FIG. 3 is a cross sectional view of a liquid crystal display capable of displaying a color image.
Figure 4:
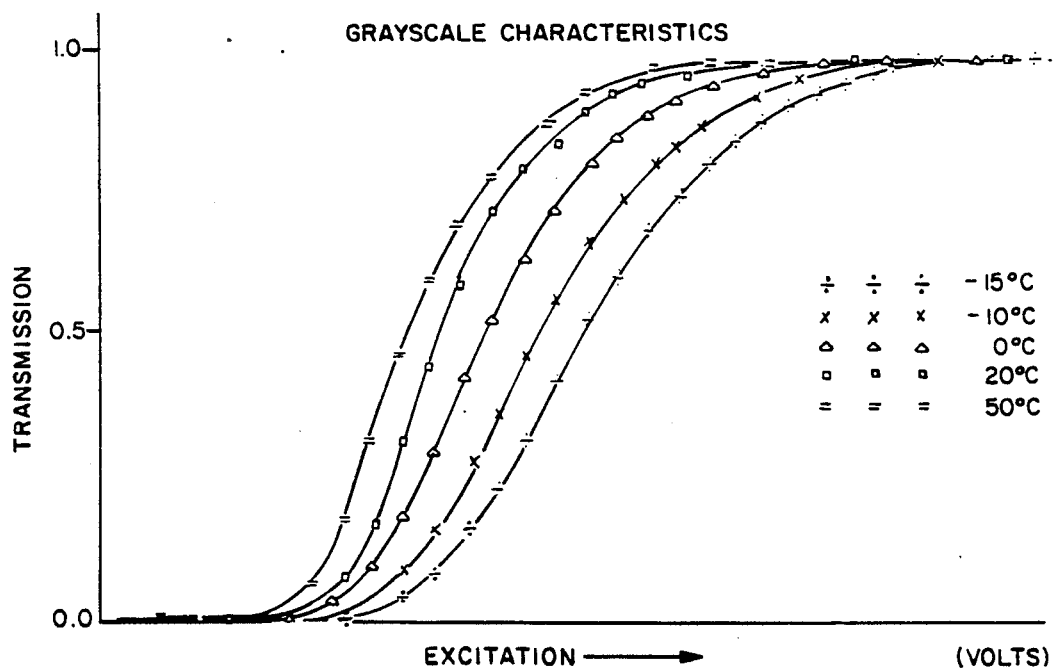
FIG. 4 in plot of optical transmission as a function of voltage (applied electric field) for a liquid crystal display for several temperatures.

For low precision displays such as are used in certain consumer products, the addition of a constant term to the voltage applied to the display region may be satisfactory. For example, referring to FIG. 4, the shape of the transmission versus voltage curves is generally the same, but each curve appears to be off-set in voltage from the other curves. To a first approximation, this off-set in voltage can frequently be represented by a constant value. In the high precision displays, a more elaborate functionality for the stored logic signal groups may be required.

For image displays wherein images are formed by a multiplicity of pixel elements, the addressing circuits of the liquid crystal display are synchronized with the temperature compensation circuits so that the voltage applied to each pixel element is compensated for temperature.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A compensated liquid crystal display comprising:
   at least one cell having a liquid crystal material enclosed between two electrodes;
   a temperature sensing element thermally coupled to said cell for providing a temperature signal;
   a heater unit thermally coupled to said cell;
   a thermostat coupled to said temperature sensing element and to said heater unit, said thermostat activating said heater unit in response to said temperature signal when a temperature of said cell is below a predetermined range;

an analog to digital converter responsive to said temperature signal for providing a first digital signal group determined by said temperature signal;

conversion means responsive to a combination of said first digital signal group and a second digital signal group for providing a third digital signal group, said second digital signal group determined by a desired optical transmission through said cell, said third digital signal group determining a desired voltage for application to said electrodes, said desired voltage resulting in said desired transmission; and a digital to analog converter coupled to said electrodes for converting said third signal group to said desired voltage, said desired voltage compensating for properties of said liquid crystal material.

2. The liquid crystal display of claim 1 wherein said conversion means includes a memory unit, said combination of said first signal group and said second signal group providing an address in said memory unit wherein said third signal group is stored.

3. The liquid crystal display of claim 2 wherein said memory unit is a PROM unit.

4. The liquid crystal display of claim 2 wherein said third signal group includes compensation for a temperature dependence of said liquid crystal cell.

5. The liquid crystal display of claim 2 wherein said third signal group includes compensation for nonlinearity of an optical transmission of said liquid crystal cell as a function of voltage applied to said electrodes.

6. A method of providing a compensated voltage to activate a liquid crystal display cell, said method comprising the steps of:

identifying a desired optical transmission of said liquid crystal cell by a first digital signal group;

identifying a temperature of said liquid crystal cell by second digital signal group;

combining said first and said second digital signal groups to provide a combined first and second digital signal group;

determining a third digital signal group from said combined first and second digital signal group, said third digital signal group identifying an acutal voltage to activate said liquid crystal cell, said actual voltage resulting in said desired optical transmission of said liquid crystal cell when applied thereto;

converting said third signal group to said actual voltage;

applying said actual voltage to said liquid crystal cell; and maintaining said liquid crystal cell within a predetermined temperature range.

7. The method of claim 6 wherein said identifying a temperature step includes the steps of:

measuring a temperature of said liquid crystal cell by means of a temperature sensing unit, said temperature sensing unit providing an analog signal related to said liquid crystal cell temperature; and converting said analog signal to said second digital signal.

8. The method of claim 7 wherein said determining step includes the step of addressing a memory unit location with said combined first and second digital signal group, said memory unit location storing said third signal group.

9. The method of claim 8 wherein said converting a third digital signal group includes the step applying said third digital signal group to a digital to analog converter to provide said actual voltage.

10. A temperature compensated liquid crystal display comprising:

at least one cell containing a liquid crystal material, an optical transmission of said cell determined by an activation voltage, wherein a desired optical transmission of said cell is identified by a second logic signal group; and voltage means for providing said activation voltage to said cell, said voltage means including;

temperature means thermally coupled to said cell for providing a first logic signal group identifying a temperature of said cell, and conversion means responsive to a combination of said first logic signal group and to said second logic signal group for providing a desired activation voltage, said desired activation voltage providing said desired optical transmission by said cell when applied to said cell;

a heater element thermally coupled to said cell; and a thermostat coupled to said temperature means and to said heater element, said temperature means and said temperature causing said heater element to maintain said cell within a predetermined temperature range.

11. The liquid crystal display of claim 10 wherein said conversion means has a memory unit, said combination of said first and said second logic signal groups are applied to address terminals of said memory unit.

12. The liquid crystal display of claim 11 wherein said conversion means includes a digital to analog converter for converting a third logic signal group stored in said memory means at a location determined by said combination of said first and said second logic signal group to said desired activation voltage.

13. The liquid crystal display of claim 12 wherein said third logic signal group is selected to provide a desired activation voltage compensating an optical transmission identified by said first logic signal group for a temperature dependence of said cell for a temperature of said cell identified by said second logic signal group.

14. The liquid crystal display of claim 13 wherein said third logic signal group is also selected to provide compensation for the nonlinear characteristics of an optical transmission of said cell as a function of said activation voltage.

15. The liquid crystal display of claim 11 wherein said memory unit is a PROM unit.

16. The liquid crystal display of claim 14 further comprising a transistor coupled to said cell and to said voltage means, said transistor controlling when said desired activation voltage is applied to said cell.

17. The liquid crystal display of claim 12 further comprising a plurality of cells, wherein said cells are arranged in a matrix configuration.

* * * * *